Nov. 19, 1968  J. JOSEPHSON  3,411,354
CURRENT METER
Filed Aug. 18, 1966

INVENTOR
JULIAN JOSEPHSON

BY Melvin L. Crane AGENT
R. S. Sciascia ATTORNEY

United States Patent Office 3,411,354
Patented Nov. 19, 1968

3,411,354
CURRENT METER
Julian Josephson, 4814 Eastern Lane, Apt. 103,
Suitland, Md. 20023
Filed Aug. 18, 1966, Ser. No. 573,392
5 Claims. (Cl. 73—170)

ABSTRACT OF THE DISCLOSURE

This disclosure is directed to a device for determining ocean currents with a minimum of moving parts. The device includes a three stage fluid amplifier system in which the only movable parts are control valves and pressure gages none of which are directly in the current flow through the amplifier system. The fluid amplifiers are connected in series such that the outputs of one stage controls the fluid output flow through the next stage in the series, etc. The output of the last fluid amplifier stage is provided with a pressure gage and a fluid flow meter which determines the flow of the water through the last stage of the fluid amplifier system. The pressure indicated by the pressure gage and the fluid flow indicated by the flow meter represents the current flow measured by the amplifier system. In use, the device is suspended from a stationary ship, secured to a buoy, or any other means from which current flow may be determined.

---

The invention described herein may be manufactured and used by or for the Government of the United States of America for governmental purposes without the payment of any royalties thereon or therefor.

The present invention is directed to a device for detecting ocean currents and more particularly to a device for detecting ocean currents with a minimum of moving parts.

Heretofore various types of ocean current meters have been used in which many moving parts are provided to determine the velocity of the current. Some of these devices make use of a record internally built within the current meter to provide a graph which is retrieved with the meter after a certain period of time. Other current meters are made with rotatable parts which produce an electrical signal in accordance with the rotation of an element within the current meter. Due to the sensitivity required and the construction of the prior art devices these devices are relatively expensive and require special handling because of the nature of the device.

The present invention overcomes problems presented by prior art devices through use of a three stage fluid amplifier system in which the only moveable parts are control valves, and a pressure gage, none of which are directly in the current flow through the amplifier system. The device is mounted in the water such that water flows through each of the amplifier stages where the water flow is amplified and then output of the final stage is provided with a pressure gage to measure the pressure of the water on passing through the output and a fluid flow meter which determines the rate of flow of the water therethrough which is then related to the current flow of the stream being detected. The device is normally used by suspension from a stationary ship, a buoy or any other means. The pressure gage presents a signal which is received and translated into current flow in accordance with flow test of the device. Thus, the present invention provides current flow data with a minimum of moving parts.

It is therefore an object of the present invention to provide a current flow meter which has very few moving parts, which is very sensitive, and which is simple in operation and relatively inexpensive.

Another object is to provide a current meter which has no moving parts within the current flow stream.

Still another object is to provide a device which has the capability of measuring ocean currents in their three-dimensional aspect.

Yet another object is to provide a current meter which is extremely sensitive to any ocean current flow.

Figure 1:
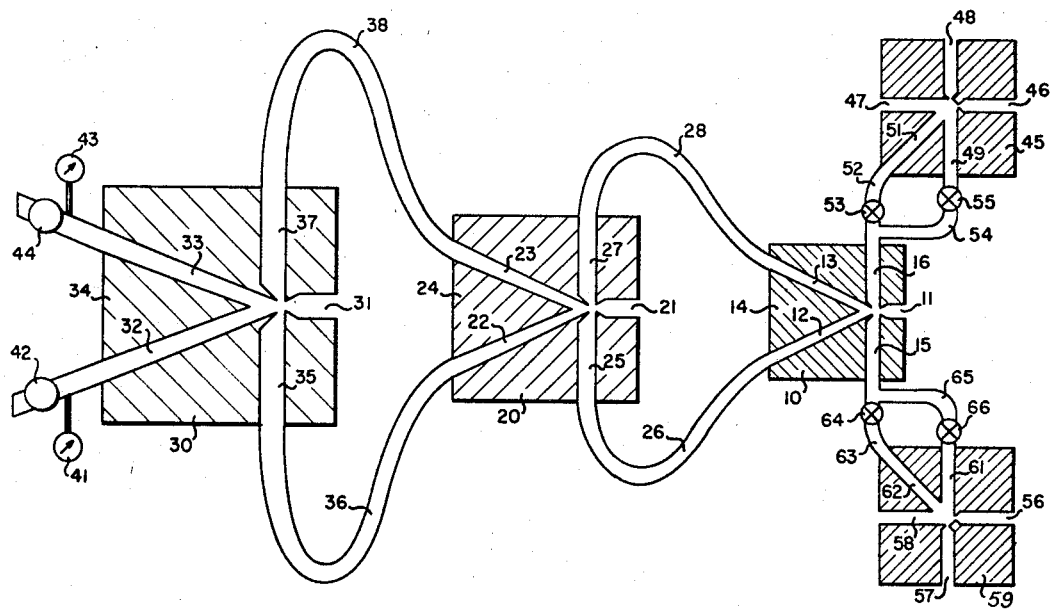
Figure 2:
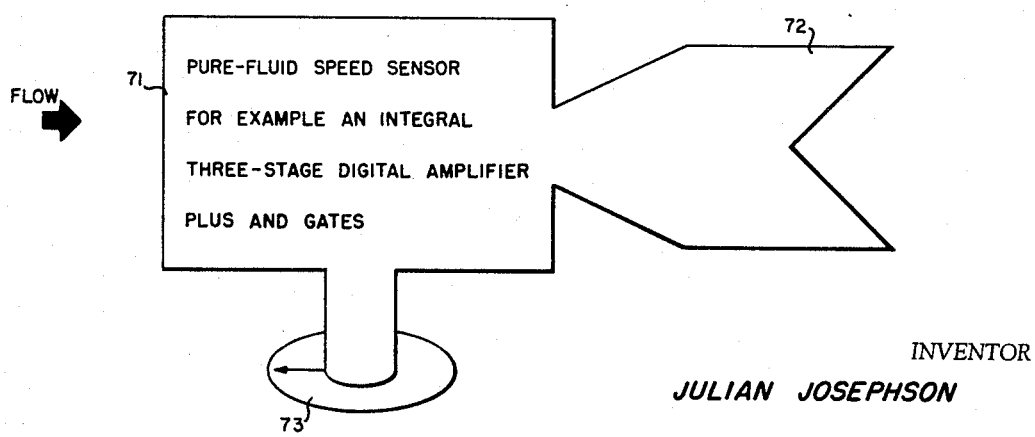

The nature of this invention as well as other objects and advantages thereof will be readily apparent from consideration of the following specification relating to the annexed drawing, in which:

FIG. 1 is a schematic diagram illustrating the relationship between the various fluid amplifier sections of the device; and FIG. 2 represents a schematic of a device which would include the apparatus as shown in FIG. 1 in an operable configuration for use in determining current flow.

Now referring to the drawings, there is shown by illustration in FIG. 1 a schematic of the current flow meter of the present invention. As shown, the device includes three separate fluid amplifier stages interconnected with each other such that the second and third stages are controlled as a result of the output from the first stage. The first stage 10 includes a fluid flow input 11 having outputs 12 and 13 each of which are separated by splitter 14. Flip-flop amplifier 10 is provided with control passages 15 and 16 which are connected to suitable control inputs which will be explained later. The second stage of the fluid amplifier system is formed of a flip-flop fluid amplifier 20 having a fluid flow inlet 21 and outlets 22 and 23 separated by splitter 24. The fluid inlet 21 of the flip-flop 20 comprises a control passage 25 which is connected with output 12 by a flow line 26 and a control passage 27 which is connected to output 13 of flip-flop 10 by use of a fluid flow line 28. The third stage, flip-flop element 30 comprises a fluid flow input 31 and outputs 32 and 33 which are separated by splitter 34. The flip-flop 30 is provided with a control passage 35 which is connected to the output 22 of flip-flop 20 by a suitable flow line 36. Flip-flop 30 is also provided with a control passage 37 which is connected with the output 23 of flip-flop 20 by use of a suitable flow passage 38. Output 32 of flip-flop 30 is provided with a pressure gage 41 that measures the pressure of the fluid within outlet 32 and a suitable fluid flow meter indicator 42 that indicates the rate of fluid flow through outlet 32 whereas output 33 is provided with a pressure gage 43 and a suitable flow meter 44 that functions the same as pressure gage 41 and fluid flow meter 42. The fluid flow indicator may be of any well known type particularly electric types that have no moving parts.

Flow gain is obtained by use of the three different amplifier stages. As shown, the inlet and flow passages are larger in the amplifier stages 20 and 30, respectively. As the gain in flow at the outputs of each respective stage increases, so does the size of the inlets for each of the respective stages. Therefore, a gain in current flow will be obtained by the use of additional stages. The pressure gages and fluid flow meters will measure the pressure and flow of the fluid within the outlet of the last stage. The outputs are compared with known current flow values obtained during test in order to provide current flow values during actual use. The particular gain by each fluid amplifier is determined by design which is well known in the art.

The portion of the flow meter as shown in FIG. 1, as described above, is suitable for determining horizontal current flow of the water, however, it is desired at certain times that the vertical flow and also upwelling may be determined therefore additional AND Logic Modules have been appropriately connected to the control passages 15 and 16 of flip-flop 10 in order to determine vertical and upwelling flow. AND Logic Module 45 is provided with a horizontal input 46 which has an output passage 47 in alignment therewith and an input 48 which has an output passage 49 in alignment therewith. The module is also provided with an outlet 51 at a 45° angle with respect to outlets 47 and 49. Outlet 51 is connected to control passage 16 of flip-flop 10 by a suitable connecting line 52 which is provided with a suitable control valve 53 therein for opening and closing off the passage. Outlet passage 49 is connected by a suitable connecting line 54 to the line 52 at a point between the control valve 53 and the control passage 16 of flip-flop 10. Passage 54 is provided with a control valve 55 therein for opening and closing the outlet passage from the outlet 49. AND Logic Module 59 is provided with a horizontal inlet 56 and a vertical inlet 57 on the bottom side thereof. Inlet 56 is provided with an outlet 58 in alignment therewith whereas inlet 57 is provided with an outlet 61 in alignment therewith. An outlet passage 62 is provided between outlets 58 and 61. The outlet 62 is connected with control passage 15 of flip-flop 10 by a suitable line 63 which is provided with a control valve 64 therein for opening and closing the passage 63. Outlet 61 is connected to line 63 at a point between valve 64 and the inlet passage 15 by a suitable connecting line 65. Connecting line 65 is provided with a valve 66 therein which opens and closes the connecting line 65, as desired.

In operation of the device to determine current flow, the fluid amplifiers 10, 20, and 30 as shown in FIG. 1 are placed under the water surface such that the fluid inlets 11, 21, and 31 are horizontal with the water surface and facing in the direction of the current. In order to determine horizontal flow of the current, valves 53, 55, 64, and 66 will be closed to close off the control lines from the AND Logic Modules 45 and 59. Water entering inlet 11 will flow along either outlet 12 or 13 and be directed to a control passage of flip-flop amplifier 20. Assuming that the fluid through inlet 11 follows the outlet 12, then the fluid through inlet 21 will be controlled by the fluid from outlet 12 entering through control element 25. The fluid entering through control element 25 will apply a force on the fluid entering through inlet 21 directing the fluid along the outlet passage 23 in amplifier 20. The fluid from outlet 23 will be directed through control passage 37 in module 30. Thus, the fluid flowing through inlet 31 of amplifier 30 will be directed out through outlet 32 such that the pressure gage 41 will indicate the pressure due to water flow through outlet 32. Also, the flow meter 42 will indicate the velocity of the fluid flow from passage 32. The fluid flow represented by the pressure gage 41 and the flow meter 42 will be indicative of the current flow of the water within which the device is placed. If the water through inlet 11 of amplifier 10 takes the path through outlet 13 then the outlet from module 30 will be through passage 33 wherein the pressure gage 43 and flow meter 44 will indicate a representation of the current flow of the water within which the device is placed. The above operational description of the device is for determining the horizontal current flow.

Operation of the AND Logic Modules are such that current flow through input 56 will pass through output 58 and current through input 46 will pass through output 47, thus when the current flow is horizontal the fluid flow through inlets 46 and 56 will pass out through outlets 47 and 58, respectively and have no effect on the current measured. Assume that the current flow is at an angle with respect to the horizontal such that the flow is downwardly at an angle with the surface, thus fluid flow will enter into input 46 and input 48, in this event, the fluid flow will flow from AND Logic Module 45 out through outlet 51. By opening valve 53 when the current flow is at an angle with respect to AND Logic Module 45 the flow through output 51 will pass through valve 53 into control passage 16 of flip-flop amplifier 10. Thus, the fluid in control passage 16 will force the fluid entering through inlet 11 to be directed along passage 12 and into control passage 25 of flip-flop 20. Therefore, the current flow into passage inlet 21 will be directed through output passage 23 into control passage 37 of flip-flop 30. Consequently, the flow through input 31 will be directed through output 32 wherein the current flow at an angle relative to the horizontal axis of the device will be measured by pressure gage 41 and flow meter 42. Thus, the flow at an angle downwardly can be determined by use of AND Logic Module 45.

Assuming that there is a downward vertical flow of the current, valves 53, 64, and 66 will be closed whereas 55 will be opened. Thus, the current flow will enter into inlet 48 of AND Logic Module 45 and be directed through outlet 49 into control passage 16. The fluid through control passage 16 will control the inlet flow through inlet 11 of module 10 such that the fluid will be directed through outlet 12 and subsequently be measured by pressure gage 41 and flow meter 42 which measures the flow from output 32 of module 30. The measurement of pressure gage 41 and 42 will then be indicative of the vertical flow through the detected device. Likewise valves 53, 55, and 64 may be closed, with valve 66 open, thus, any upwelling in the current flow may be measured by the upward flow through input 57 out through passage 61 into control passage 15. The fluid through input 11 of flip-flop 10 will be controlled by the fluid in passage 15 such that the fluid will be directed through output 13 and consequently the fluid will be amplified and will be directed through output 33 wherein the pressure gage 43 and flow meter 44 will present a measure indicative of any upwelling.

If the current flow is upward at an angle to the horizontal, then valves 53, 55 and 66 will be closed and valve 64 opened, thus the current flow through input 56 and 57 of AND Logic Module 46 will be directed through output 62 into control passage 15. Thus, the fluid flow through input 11 of flip-flop 10 will be directed through output 13, output 22, and output 33 wherein the pressure gage 43 and flow meter 44 will indicate the current flow of the fluid at an angle upwardly, upwelding, with horizontal.

Thus, it can be seen by proper control of the valves 53, 55, 63, and 66 that the current flow may be determined along the horizontal plane, the vertical plane down and up, and also at an angle to the horizontal by use of the fluid amplifiers in conjunction with the AND Logic Module amplifiers 45 and 46.

For a particular current flow there will be a particular current flow reading. If the current flow is horizontal and a reading is taken, a particular value will be given. Then, if valves 53 and 64 are opened and closed respectively and there is no change in the current output reading then there is no vertical flow or upwelling. Now suppose there is a current flow at an angle with respect to the horizontal, with valves 53 and 64 closed there will be a current reading to indicate that portion of the horizontal current flow. If the vertical flow is downwardly, then by opening valve 53, the fluid in input 11 will be directed out of output 12 resulting in a reading by pressure gage 41 and fluid flow meter 42. The readings will be greater than when the valve 53 was closed; therefore a difference in the reading will indicate the flow due to the vertical portion of the current flow. The same applies for upwelling, when valve 64 is opened except then the fluid will be directed out through outlet 13 resulting in a reading by pressure gage 43 and flow meter 44. Then the difference between the reading with valve 64 open and with valve 64 closed will determine the flow due to upwelling. Thus, the AND Logic Modules in combination with the fluid amplifiers 10, 20 and 30 will provide an indication of vertical current flow; that is, a flow which is not horizontal.

FIG. 2 illustrates a schematic diagram of a current meter device in which the fluid amplifier system would be mounted. The device includes a body 71 and a vane 72 extending therefrom such that the device will be lined up in the current stream by the vane. At the bottom of the housing, there is shown a magnetic compass arrangement 73 which may be used for indicating the direction of the current with respect to magnetic north pole. Thus, by use of the fluid amplifier system that makes up the current indicating device and the magnetic compass arrangement applicant provides useful instrumentation by which the current flow and direction of the current may be obtained.

It would be obvious to one skilled in the art that the current measuring device set forth herein may be made as a part of a buoy system wherein the current meter would be held stationary and the signals therefrom could be sent back to shore by a telemetering system or by suitable electrical lines connected thereto provided the device is sufficiently close to shore for such electrical lines. Obviously the device may be used from shipboard wherein the device would be held over the side of the ship in a desired current stream. Also different fluid amplifier arrangements may be made wherein additional amplifier stages may also be used without departing from the teaching of the present invention.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for determining ocean currents by use of fluid amplifiers wherein the fluid amplifiers are placed within the ocean water and cooperate together, said system comprising:
   a first controlled-flip-flop amplifier,
   said first fluid amplifier including an inlet for admitting current flow, first and second control passages relative to said inlet and first and second output passages,
   an adjustable fluid flow control means connected with each of said first and second control passages of said first fluid amplifier,
   an AND Logic Module connected with said first control passage of said first fluid amplifier,
   a second controlled-flip-flop fluid amplifier,
   said second fluid amplifier including an input, first and second control passages, and first and second output passages,
   fluid flow means connecting said first output of said first fluid amplifier passage to said first control passage of said second fluid amplifier,
   fluid flow means connecting said second output passage of said first fluid amplifier to said second control passage of said second amplifier,
   a third controlled-flop-flip amplifier,
   said third controlled fluid amplifier comprising a fluid inlet, first and second control passages, and first and second output passages,
   fluid flow means connecting said first control passage of said third fluid amplifier to said first output of said second fluid amplifier,
   fluid flow means connecting said second fluid control passage of said third fluid amplifier to said second fluid output passage of said second fluid amplifier,
   fluid flow measuring means secured to the outputs of each of said first and second outputs of said third fluid amplifier to detect the flow through each of the separate output passages, and
   means for positioning said system within the ocean with said inlet of each of said first, second and third fluid amplifiers under the surface of the water substantially parallel to the water surface and aligned with the inlet facing in the direction from which the current flows.

2. A system as claimed in claim 1, wherein:
   an AND Logic Module is connected to said second control passage of said first fluid amplifier.

3. A system as claimed in claim 2, wherein:
   each of said AND Logic Modules comprise first and second input passages at approximately a 90° angle angle relative to each other, with first and second output passages in alignment with said first and second input passages, and a third output positioned between said first and second output passages,
   said third output of each of said AND Logic Modules connected with one of each of said control inputs of said first fluid amplifier.

4. A system as claimed in claim 3, wherein:
   said second output of each of said AND Logic Modules are also connected to one each of said control passages in said first fluid amplifier.

5. A system as claimed in claim 4, wherein:
   said first output of each of said AND Logic Modules are connected to one of each of said input passages at a point between said adjustable fluid flow control means and the input passages in said first fluid amplifier.

References Cited

UNITED STATES PATENTS 3,250,471   5/1966   Gobhai et al. _____ 235—201
3,338,515   8/1967   Dexter _____ 235—201

OTHER REFERENCES

Campagnuolo, "A Three Stage Digital Amplifier," Harry Diamond Laboratories, Army Materiel Command, August 1963, TR–1106, (pp. 1 to 13 and 23 relied on).

RICHARD C. QUEISSER, *Primary Examiner.*

EDWARD D. GILHOOLY, *Assistant Examiner.*